US012609392B2

(12) United States Patent
Faruque et al.

(10) Patent No.: US 12,609,392 B2
(45) Date of Patent: Apr. 21, 2026

(54) VEHICLE BATTERY ENCLOSURE

(71) Applicant: Ford Global Technologies, LLC, Dearborn, MI (US)

(72) Inventors: Mohammad Omar Faruque, Ann Arbor, MI (US); Dean M. Jaradi, Macomb, MI (US); S.M. Iskander Farooq, Novi, MI (US); Saeed D. Barbat, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 542 days.

(21) Appl. No.: 18/184,210

(22) Filed: Mar. 15, 2023

(65) Prior Publication Data

US 2024/0313322 A1 Sep. 19, 2024

(51) Int. Cl.
| | |
|---|---|
| *B60K 1/04* | (2019.01) |
| *B60R 16/04* | (2006.01) |
| *B60R 21/21* | (2011.01) |
| *H01M 50/249* | (2021.01) |
| *B60R 21/00* | (2006.01) |

(52) U.S. Cl.
CPC ............. *H01M 50/249* (2021.01); *B60K 1/04* (2013.01); *B60R 16/04* (2013.01); *B60R 21/21* (2013.01); *B60K 2001/0438* (2013.01); *B60R 2021/0006* (2013.01); *B60Y 2306/01* (2013.01); *H01M 2200/10* (2013.01); *H01M 2220/20* (2013.01)

(58) Field of Classification Search
CPC ... B60R 3/02; B60R 2021/346; B60L 3/0046; B60K 2001/0438
See application file for complete search history.

(56) References Cited

U.S. PATENT DOCUMENTS

| | | | |
|---|---|---|---|
| 7,232,001 B2 * | 6/2007 | Hakki | B60R 19/205 |
| | | | 180/271 |
| 7,806,221 B2 * | 10/2010 | Mishra | B60R 21/01508 |
| | | | 280/730.1 |
| 9,045,030 B2 | 6/2015 | Rawlinson et al. | |

(Continued)

FOREIGN PATENT DOCUMENTS

| | | | |
|---|---|---|---|
| CN | 111546868 A | 8/2020 | |
| DE | 102010006514 A1 * | 9/2010 | B60K 1/04 |

(Continued)

OTHER PUBLICATIONS

Translation of DE-102016217934-A1 (Year: 2018).*

(Continued)

*Primary Examiner* — Katy M Ebner
(74) *Attorney, Agent, or Firm* — Frank A. MacKenzie; Brooks Kushman P.C.

(57) ABSTRACT

A vehicle battery enclosure includes a first member elongated along an axis and a second member spaced from the first member. The vehicle battery enclosure includes a battery compartment between the first member and the second member. A wing is rotatably connected to the first member and is rotatable relative to the first member from a stowed position (FIGS. 1, 4A, 4B) to a deployed position (FIGS. 2, 3, 5A, 8, and 9). The wing is aligned with the battery enclosure along the axis in the deployed position. A pyrotechnic actuator is operatively coupled to the wing to rotate the wing to the deployed position.

20 Claims, 7 Drawing Sheets

(56) References Cited

U.S. PATENT DOCUMENTS

| 10,046,729 B2 * | 8/2018 | Perez Garcia | B60R 21/34 |
|---|---|---|---|
| 11,352,064 B2 * | 6/2022 | Choi | B60K 1/04 |
| 12,077,122 B1 * | 9/2024 | Jaradi | B62D 25/04 |
| 2013/0022851 A1 * | 1/2013 | De Oliveira | B60L 3/0069 |
| | | | 429/100 |
| 2013/0270864 A1 | 10/2013 | Young et al. | |
| 2018/0354438 A1 * | 12/2018 | Baccouche | B60L 3/0046 |
| 2022/0363143 A1 * | 11/2022 | Faruque | B60L 50/66 |
| 2024/0313322 A1 * | 9/2024 | Faruque | B60R 16/04 |
| 2024/0399844 A1 * | 12/2024 | Farooq | B60K 1/04 |
| 2024/0399962 A1 * | 12/2024 | Wang | B60R 3/02 |
| 2024/0416997 A1 * | 12/2024 | Faruque | B62D 21/155 |

FOREIGN PATENT DOCUMENTS

| DE | 102010012109 A1 * | 10/2010 | H01M 50/264 |
|---|---|---|---|
| DE | 102014218174 A1 * | 3/2016 | B60K 1/04 |
| DE | 102016217934 A1 * | 3/2018 | B60K 1/04 |
| KR | 20120012655 A | 2/2012 | |

OTHER PUBLICATIONS

Uwai, H., et al., "Development of Body Structrure for Crash Safety of the Newly Developed Electric Vehicle," Nissan Motor Co., Ltd., 2011, 7 pages.

\* cited by examiner

VEHICLE BATTERY ENCLOSURE

BACKGROUND

An electric vehicle includes a motive battery that powers the vehicle, including propulsion of the vehicle. For example, wheels of the vehicle are powered by one or more electric motors that are powered by the motive battery. The battery is relatively large and heavy and, accordingly, the battery is typically packaged below the passenger compartment of the vehicle.

DETAILED DESCRIPTION

Figure 1:
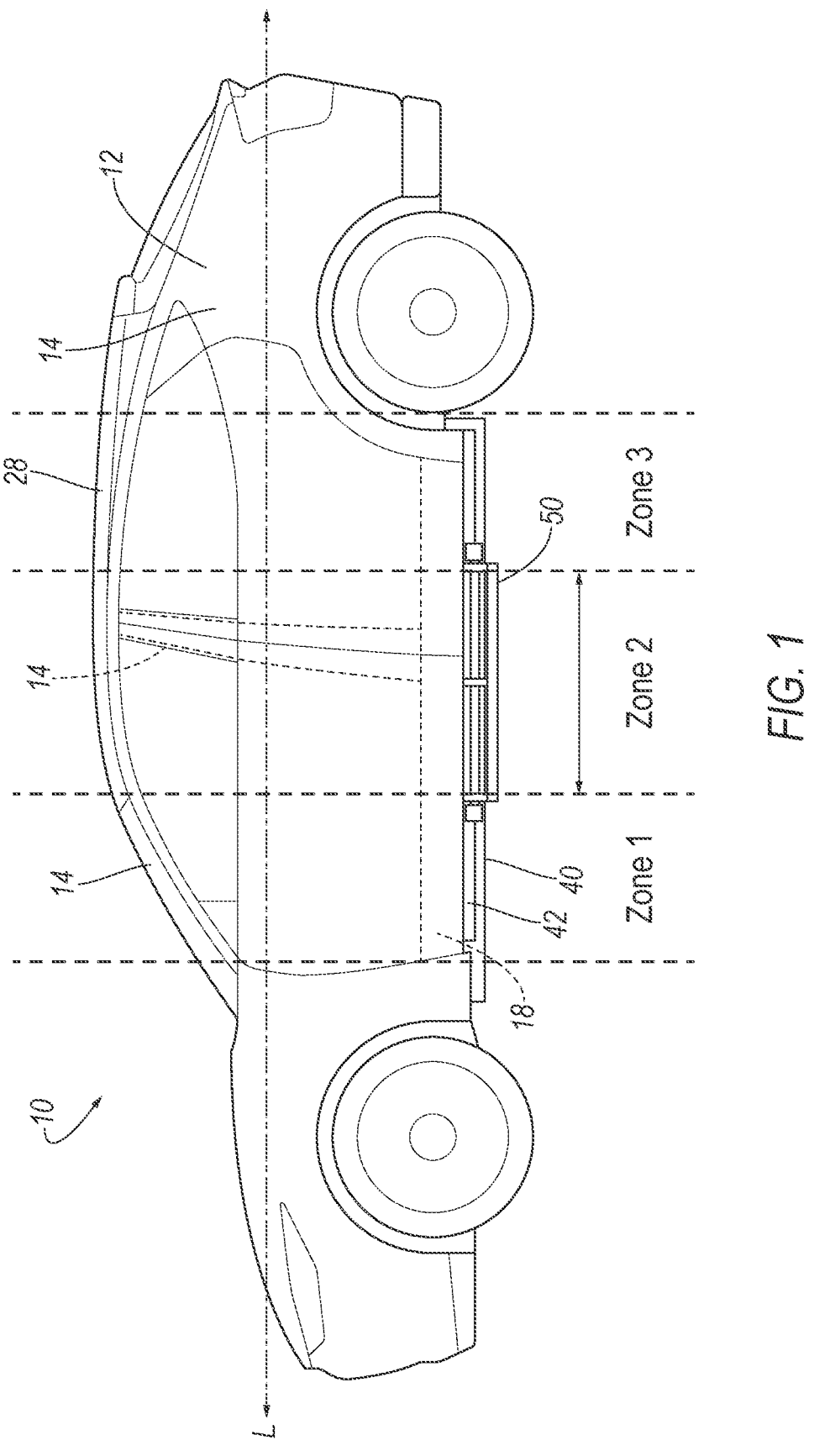
FIG. 1 is a side view of a vehicle including a vehicle battery enclosure having a wing in a stowed position.

In one or more implementations, a vehicle battery enclosure may include a first member elongated along an axis and a second member spaced the first member, a battery compartment extending between the first member and the second member, a wing rotatably connected to the first member and rotatable relative to the first member from a stowed position to a deployed position, the wing being aligned with the vehicle battery enclosure along the axis in the deployed position, and a pyrotechnic actuator operatively coupled to the wing to rotate the wing to the deployed position.

An implementation of the system may further include a hinge between the wing and the first member.

In another implementation, the wing may extend from the hinge vehicle-inboard below the first member in the stowed position and the wing may extend from the hinge vehicle-outboard of the first member in the deployed position.

In yet another implementation, the hinge may include a stop designed to stop rotation of the wing relative to the first member in the deployed position as the wing rotates from the stowed position to the deployed position.

In an implementation, the wing may include legs spaced from each other along the axis, the legs being elongated transverse to the first member.

In another implementation, the wing may include a cross-member extending between and fixed to the legs.

In yet another implementation, the legs may be sized to abut ground in the deployed position.

In a further implementation, at least one of the legs may include a hollow member and an extension member may be telescopically received by the hollow member.

In an implementation, the extension member may be retracted in the hollow member when the wing is in the stowed position and may be extended from the hollow member to an extended position when the wing is in the deployed position.

In another implementation, the wing may include a lock that locks the extension member relative to the hollow member when the extension member is in the extended position.

In a further implementation, the hollow member and the extension member may be sized so that the extension member abuts ground in the deployed position.

In an implementation, the pyrotechnic actuator may be fixed to the first member.

In another implementation, the pyrotechnic actuator may be a rotary pyrotechnic actuator configured to rotate the wing relative to the first member.

An implementation of the system may further include an airbag supported by the wing and rotatable with the wing relative to the first member from the stowed position to the deployed position.

Another implementation of the system may further include an inflator in fluid communication with the airbag.

In an implementation, the inflator may be fixed to the first member.

In another implementation, the first member may include a bottom facing ground and the wing may be rotatably connected to the bottom of the first member.

In one or more implementations, a vehicle may include a vehicle frame including first frame member and a second frame member spaced from each other cross-vehicle and elongated along a vehicle-longitudinal axis, and a vehicle battery enclosure including a first member supported by the first frame member and a second member supported by the second frame member. The vehicle battery enclosure may include a battery compartment between the first member and the second member, a wing rotatably connected to the first member and rotatable relative to the first member from a stowed position to a deployed position, the wing being aligned with the vehicle battery enclosure along the vehicle-longitudinal axis in the deployed position, and a pyrotechnic actuator operatively coupled to the wing to rotate the wing to the deployed position.

An implementation of the vehicle may further include a hinge between the wing and the first member.

Another implementation of the vehicle may further include an airbag supported by the wing and rotatable with the wing relative to the first member from the stowed position to the deployed position.

With reference to the Figures in which like numerals indicate like elements throughout the views, a vehicle battery enclosure 30 is generally shown. The vehicle battery enclosure 30 includes a first member 42 elongated along an axis A and a second member 42 spaced from the first member 42. The vehicle battery enclosure 30 includes a battery compartment 40 between the first member 42 and the second member 42. A wing 50 is rotatably connected to the first member 42 and is rotatable relative to the first member 42 from a stowed position (FIGS. 1, 4A, 4B) to a deployed position (FIGS. 2, 3, 5A 8, and 9). The wing 50 is aligned with the vehicle battery enclosure 30 along the axis A in the deployed position. A pyrotechnic actuator 65 is operatively coupled to the wing 50 to rotate the wing 50 to the deployed position.

In response to certain vehicle impacts, the pyrotechnic actuator 65 rotates the wing 50 to the deployed position. In the deployed position, the wing 50 distributes energy away from the first member 42 during certain vehicle impacts. Specifically, the wing 50 may contact the ground 100 in the deployed position during certain vehicle impacts and, in such a position, the wing 50 can distribute energy to the ground 100 during certain vehicle impacts.

Figure 6A:
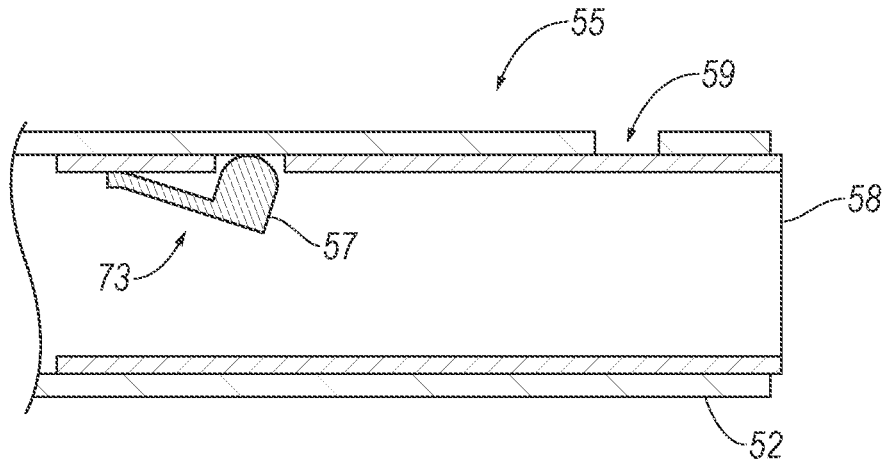
FIG. 6A is a cross-sectional view of a leg of the wing with an extension member of the leg in a retracted position.
Figure 6B:
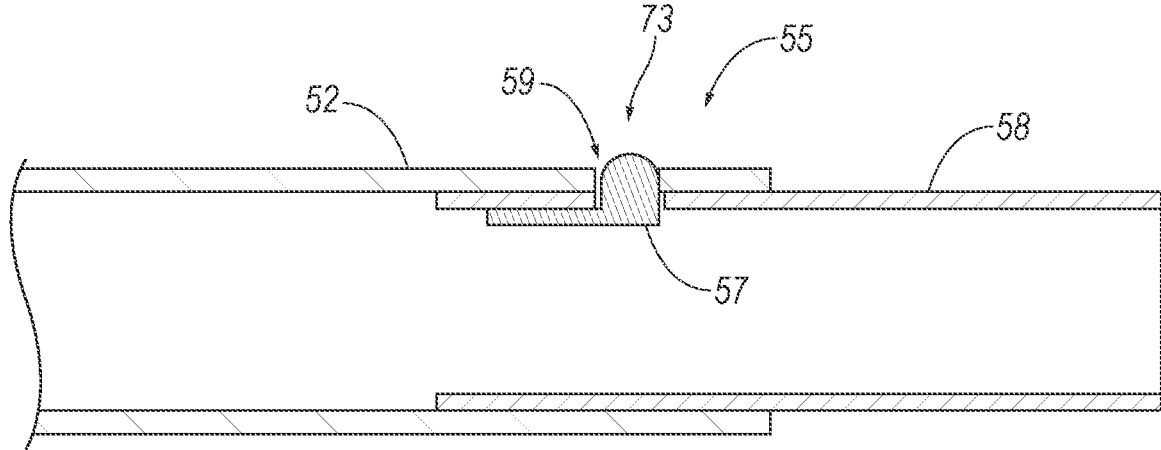
FIG. 6B is a cross-sectional view of the leg with the extension member in an extended position.
Figure 7A:
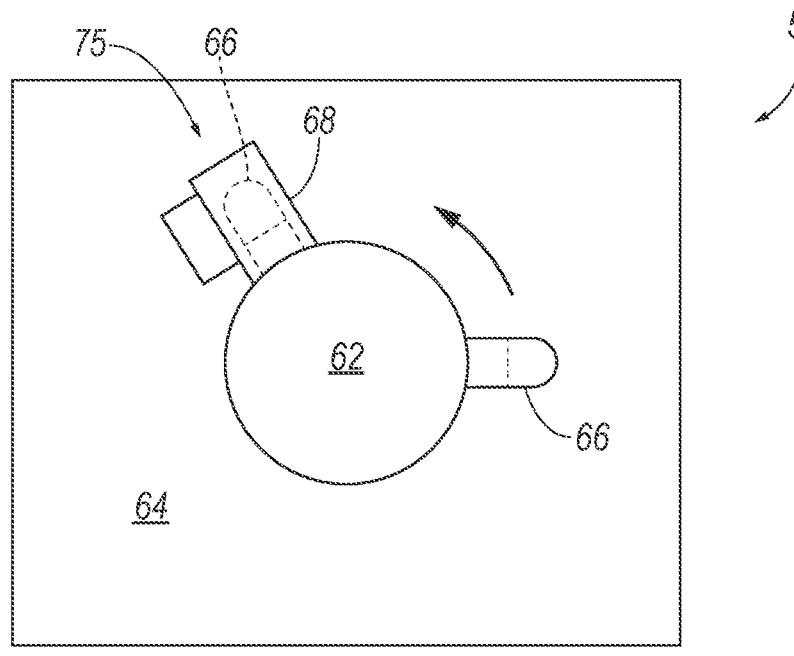
FIG. 7A is an axial view of a bearing-end block of a hinge.
Figure 7B:
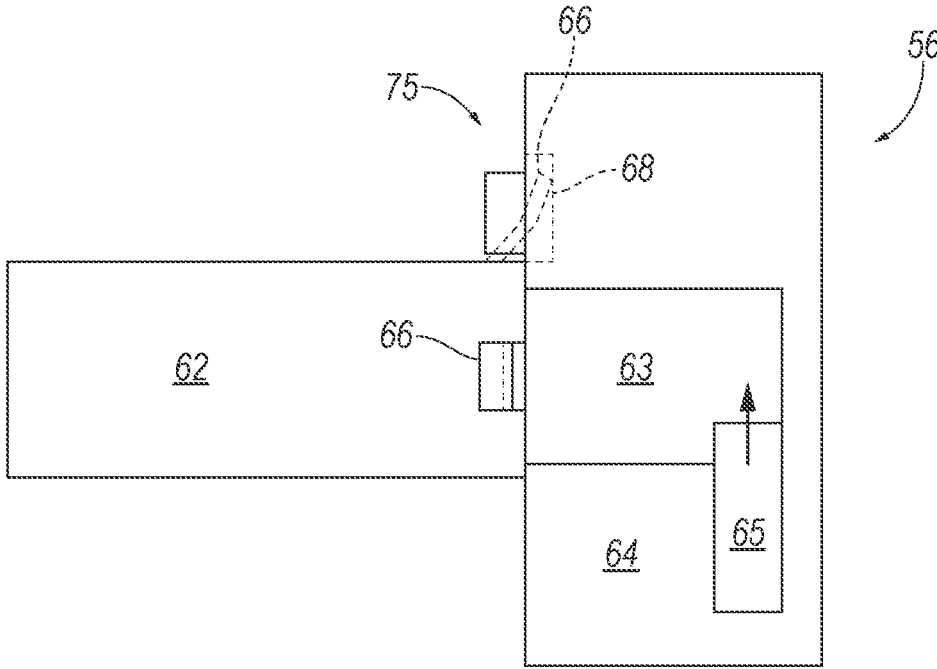
FIG. 7B is a side view of a bearing-end block of a hinge.
Figure 8:
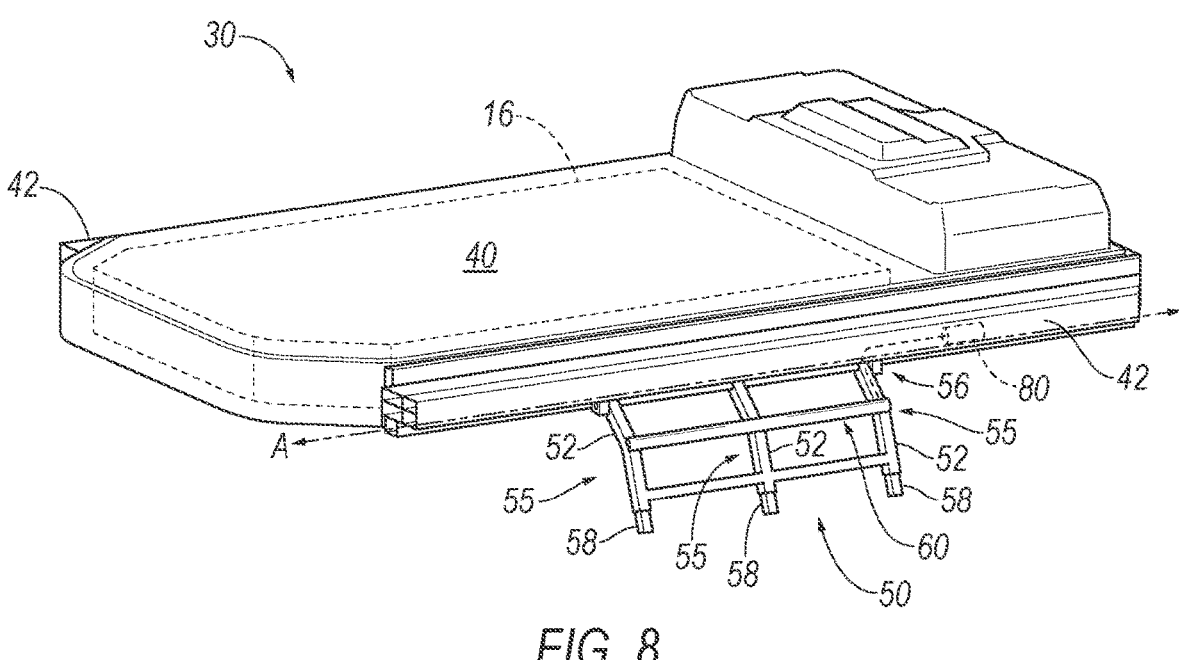
FIG. 8 is a perspective view of another example of the vehicle battery enclosure with an airbag supported by the wing with an airbag in an uninflated condition.
Figure 9:
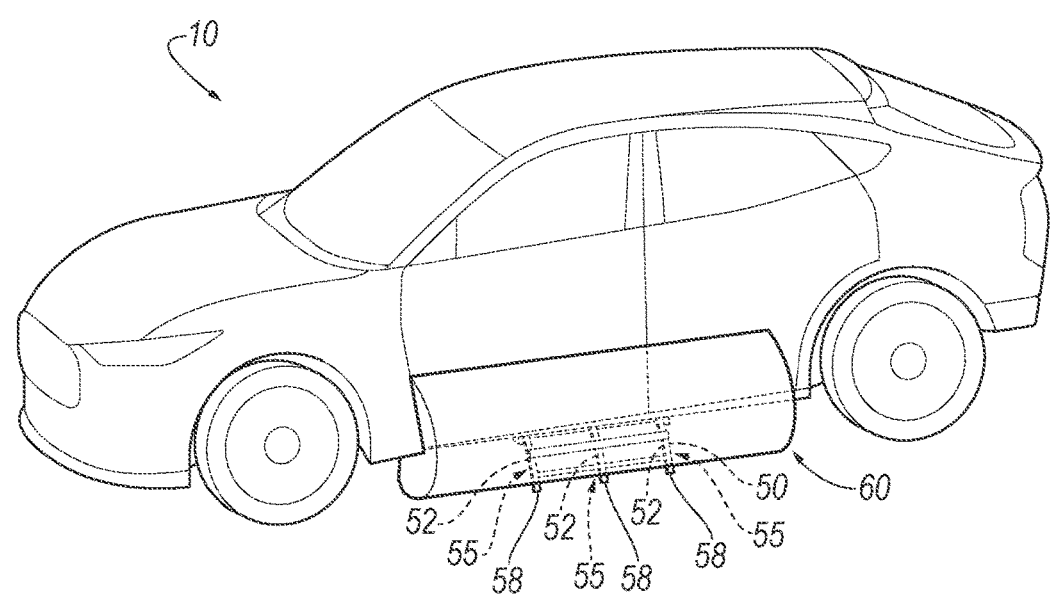
FIG. 9 is a perspective view of a vehicle including the vehicle battery enclosure of FIG. 8 with the wing in the deployed position and the airbag in an inflated condition.

One example of the vehicle battery enclosure 30 is shown in FIGS. 1-7B. Another example of the vehicle battery enclosure 30 is shown in FIGS. 8-9 and includes an airbag 60 supported on the wing 50, as described further below. Common numerals are used to identify common features in the example in FIGS. 1-7B and the example in FIGS. 8-9.

With reference to FIG. 1, the vehicle 10 may be any type of passenger or commercial automobile such as a car, a truck, a sport utility vehicle, a crossover, a van, a minivan, a taxi, a bus, etc. The vehicle 10, for example, may be an autonomous vehicle. In other words, the vehicle 10 may be autonomously operated such that the vehicle 10 may be driven without constant attention from a driver, i.e., the vehicle 10 may be self-driving without human input.

Figure 2:
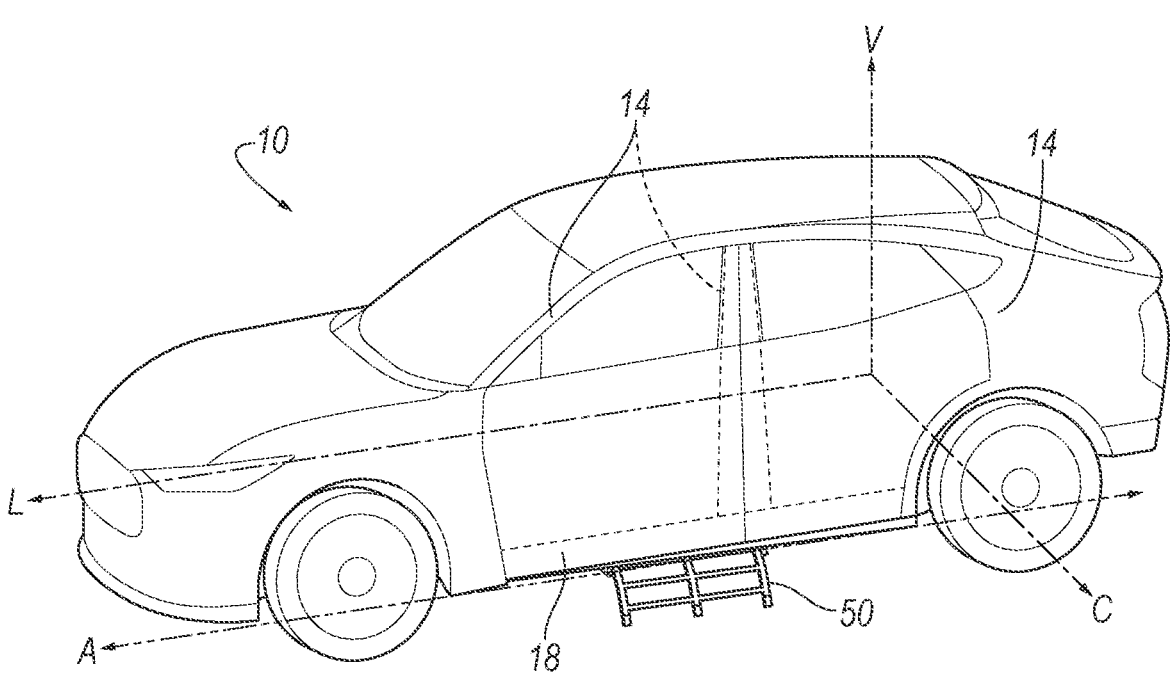
FIG. 2 is a perspective view of the vehicle with the wing in a deployed position.

With continued reference to FIG. 1, the vehicle 10 has a vehicle-longitudinal axis L extending between a front and a rear of the vehicle 10. With reference to FIGS. 1 and 2, the vehicle 10 includes a cross-vehicle axis C horizontally perpendicular to axis L, e.g., extending between a left side and a right side of the vehicle 10. The vehicle 10 includes a vertical axis V extending through a floor and a roof 28 of the vehicle 10. The vehicle-longitudinal axis L, the cross-vehicle axis C, and the vertical axis V are perpendicular relative to each other.

The vehicle 10 includes a vehicle frame 12. The vehicle frame 12 may be of a unibody construction in which the frame 12 is unitary with a vehicle body (including frame rails, pillars, roof rails, etc.). As another example, the body and frame 12 may have a body-on-frame construction (also referred to as a cab-on-frame construction) in which the body and frame 12 are separate components, i.e., are modular, and the body is supported on and affixed to the frame. In other examples, the frame 12 and body may have any suitable construction. The frame 12 and body may be of any suitable material, for example, steel, aluminum, and/or fiber-reinforced plastic, etc.

The vehicle frame 12 defines a passenger cabin (not numbered) to house occupants, if any, of the vehicle 10. The passenger cabin may extend across the vehicle 10, i.e., from one side to the other side of the vehicle 10. The passenger cabin includes a front end (not numbered) and a rear end (not numbered) with the front end being in front of the rear end during forward movement of the vehicle 10.

Figure 3:
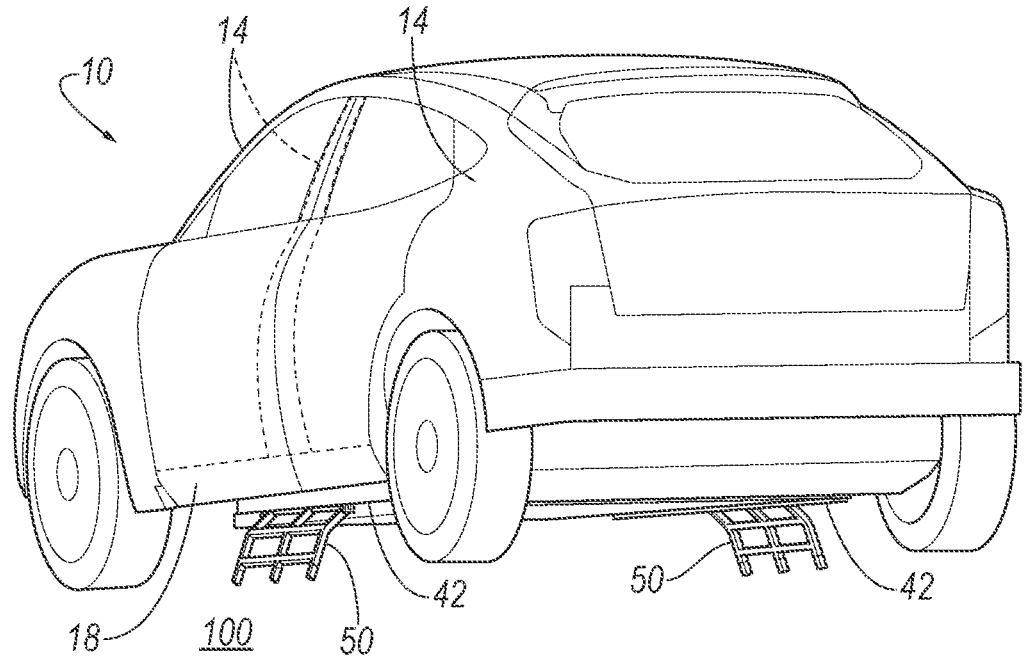
FIG. 3 is another perspective view of the vehicle with wings in deployed positions.
Figure 4A:
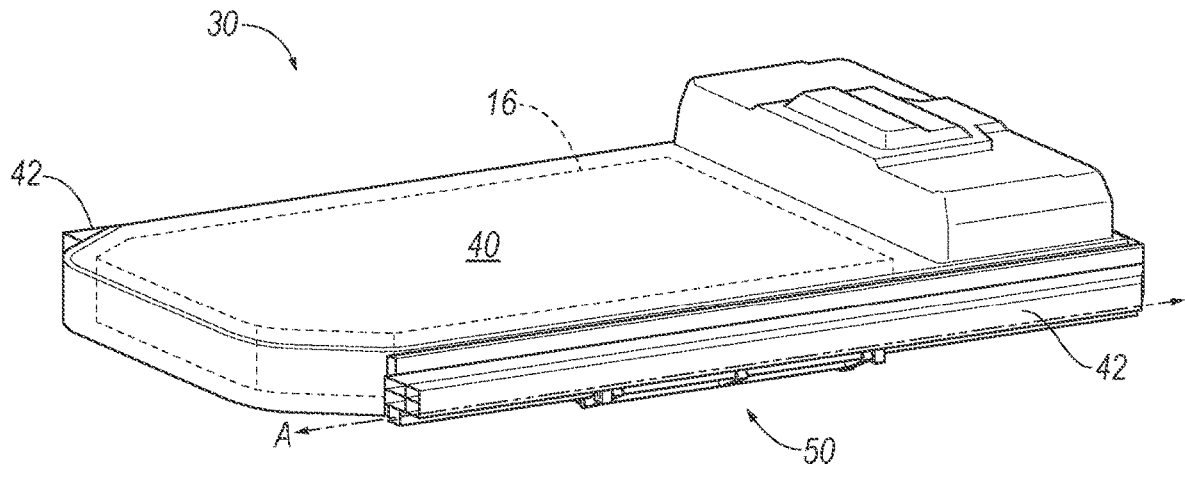
FIG. 4A is a perspective view of the vehicle battery enclosure with the wing in the stowed position.

With reference to FIGS. 1-3, the vehicle frame 12 may include pillars 14. For example, the vehicle frame 12 may include a front pillar 14, a middle pillar 14, and a rear pillar 14 on each side of the vehicle. The front pillars 14 may extend between the windshield and front doors. In other words, the front pillars 14 may be disposed at the front end of the passenger cabin. The middle pillars 14 may extend behind the front doors, e.g., between adjacent doors. In other words, the middle pillars 14 may be spaced from the front pillars by a front door opening. The rear pillar 14 may extend behind a rear door. The pillars 14 may extend from the vehicle roof 28 the vehicle floor.

With reference to FIGS. 1-3, the vehicle 10, e.g., the vehicle body, includes the roof 28 and a floor (not numbered). The roof 28 and the floor may each extend across the passenger cabin, i.e., from one side to the other side of the vehicle 10 and from the front end to the rear end of the passenger cabin. The roof 28 may define an upper boundary of the passenger cabin and the floor may define a lower boundary of the passenger cabin. The vehicle frame 12 also includes at least one door opening (not numbered) on each side of the vehicle 10.

With continued reference to FIGS. 1-3, the vehicle frame 12 includes first and second frame members 18 spaced from each other along the cross-vehicle axis C. One of the frame members 18 is shown in broken lines in FIGS. 1-3 to illustrate elements of the vehicle battery enclosure 30 that would otherwise be hidden by the frame member 18. The first frame member 18 is disposed on one side of the vehicle 10 and the second frame member 18 is disposed on the other side of the vehicle 10. The second frame member 18 is not shown, for example, in the FIG. 3. The first frame member 18 and the second frame member 18 may be mirror images and otherwise substantially identical. The first and second frame members 18 are components of the vehicle frame 12 and, in a unibody configuration, the first and second frame members 18 may be referred to as rockers. In a body-on-frame configuration, the vehicle frame 12 may be mounted to a frame, and the first and second frame members 18 may be referred to a frame rails. In either case, the frame members 18 may be the lowest portion of a side of the vehicle frame 12 and/or frame. The frame members 18 support vehicle 10 components, such as the floor, the doors, etc.

Each frame member 18 is elongated along an axis A. The axis A of the first frame member 18 may be parallel to the axis A of the second frame member 18. The axes A of the frame members 18 may be parallel to the vehicle-longitudinal axis L.

The vehicle battery enclosure 30, e.g., the battery compartment 40 and members 42 may extend from one pillar 14 to the other pillar 14 below the vehicle floor. The battery compartment 40 and members 42 may be any suitable material, for example, steel, aluminum, composites, etc.

The vehicle battery enclosure 30 includes first and second members 42 spaced from each other and elongated along the axes A and/or the vehicle-longitudinal axis L. The first and second members 42 are spaced from each along the cross-vehicle axis C. The first member 42 is supported by the first frame member 18 and the second member 42 supported by the second frame member 18. In other words, the weight of the members are borne by the frame members 18. The members 42 may be directly connected to the frame members 18, e.g., with threaded fasteners, welding, brackets, etc. The first member 42 may abut the first frame member 18 and the second member 42 may abut the second frame member 18. The members 42 mount the vehicle battery enclosure 30 to the vehicle frame 12.

The vehicle battery enclosure 30 includes a battery compartment 40. The battery compartment 40 extends between the first and second members 42. In the example shown in the Figures, the battery compartment 40 extends from the first member 42 to the second member 42. The battery compartment 40 houses a motive battery 16 of the vehicle. Specifically, the battery compartment 40 includes a chamber that receives the motive battery 16. The first member 42 and the second member 42 are fixed to the battery compartment 40, e.g., by threaded fastener, welding, brackets, unitary construction, etc. The vehicle battery enclosure 30 may be fixed to each frame member 18 via a respective member 42.

The motive battery 16 may also be referred to as an electric-vehicle battery. The motive battery 16 powers propulsion of the vehicle 10, e.g., powers a drivetrain motor. The vehicle 10 is an electric vehicle. Examples of electric vehicles include a battery-electric vehicle (BEV), a hybrid-electric vehicle (HEV), a plug-in hybrid electric vehicles (PHEV), etc.

The motive battery 16 may be of any suitable type for vehicular electrification, for example, lithium-ion batteries, nickel-metal hydride batteries, lead-acid batteries, ultracapacitors, etc. The motive battery 16 may include at least one battery module. Each battery module may include one or more battery cells. The battery compartment 40 receives motive battery 16, e.g., the battery modules. The motive battery 16 may include any suitable hardware, e.g., wiring, connectors, circuits, etc., connecting the battery modules to each other and to electrified components of the vehicle 10.

With continued reference to FIGS. 1-5A, the vehicle battery enclosure 30 includes the wing 50. The wing 50 is rotatably connected to member 42. In the example shown in the Figures, the vehicle battery enclosure 30 includes one wing 50 in each member 42, i.e., one wing 50 on either side of the vehicle 10. In such examples, the wings 50 may be mirror images and otherwise substantially identical. In other examples, the vehicle battery enclosure 30 may include only one wing 50 on the first member 42 or one wing 50 on the second member 42.

Figure 4B:
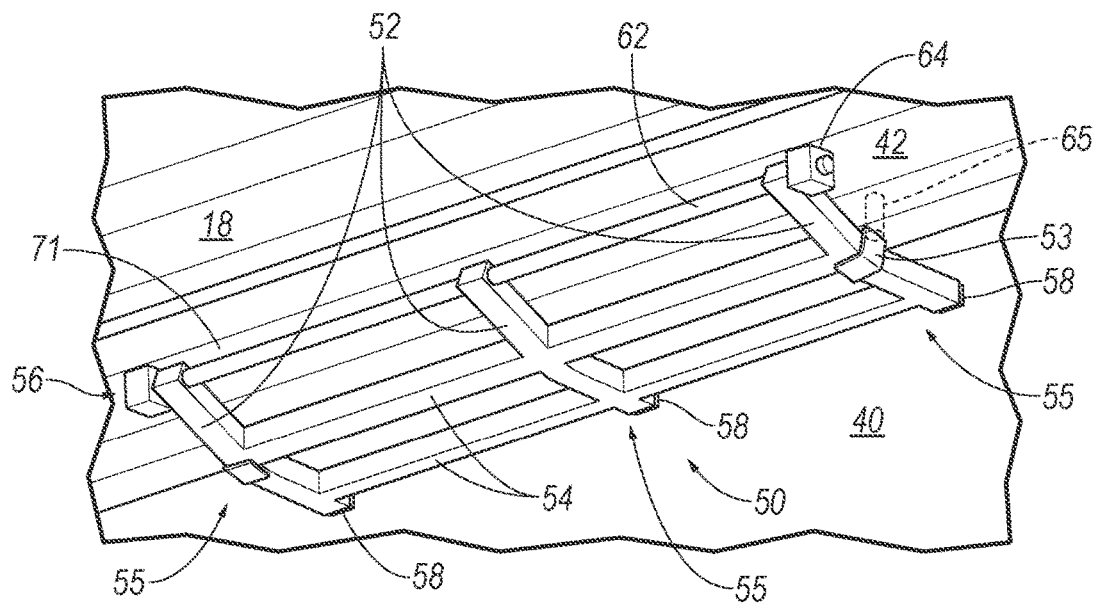
FIG. 4B is a perspective view of the wing in the stowed position.

As set forth above, the wing 50 is rotatably connected to the member 42. The wing 50 is rotatable relative to the member 42 from a stowed position to a deployed position. The wing 50 may be rotatably connected to the member 42 by a hinge 56 disposed between the wing 50 and the member 42, as described further below. For example, as illustrated in FIG. 4B, a hinge 56 may include bearing-ends 64 and a shaft 62 that is supported by the bearing-ends 64. The bearing-ends 64 may be fixed to the member 42 with, for example, threaded fasteners, welding, brackets, etc. As described further below, the shaft 62 may be rotated relative to the bearing-ends 64 to rotate the wing 50 from the stowed position to the deployed position.

The wings 50 are aligned with the vehicle battery enclosure 30 along the axis A in the undeployed position and in the deployed position. In the example shown in FIG. 1, the vehicle includes a zone 1 adjacent the front pillar 14, a zone 2 at the middle pillar 14, and a zone 3 at the rear pillar 14. The wings 50 may be aligned with zone 2 along the longitudinal axis L. In such an example, the wing 50 distributes impact forces to the ground 100 when impacted during certain vehicle impacts direct at least a portion of impact forces away from the vehicle battery enclosure 30.

In the stowed position, the wing 50 is in a vehicle-inboard position below member 42 and battery compartment 40. The member 42 may include a bottom surface facing the ground and the wing 50 may be rotatably connected to the bottom of the member 42.

With reference to FIGS. 2 and 3, the wing 50 may be deployed to the deployed position in response to certain vehicle impacts. In the deployed position, the wing 50 may contact the ground 100 to resist lateral vehicle intrusion during a lateral impact. However, for a given impact condition, an extent of a lateral vehicle intrusion may depend on position of the impact location with respect to the front and the rear of the vehicle 10.

The wing 50 is disposed below the member 42 in the stowed position and is disposed vehicle-outboard of the member 42 in the deployed position so that the wing 50 is positioned to be impacted prior to impact of the member 42 during certain vehicle impacts. Specifically, the wing 50 extends from the hinge 56 vehicle-inboard below the member 42 in the stowed position and the wing 50 extends from the hinge 56 vehicle-outboard of the member 42 in the deployed position. With reference the member 42 includes a bottom 71 (FIG. 4B) facing ground 100 and the wing 50 is rotatably connected to the bottom 71 of the member 42, e.g., through the hinge 56. A sheath (not shown) may be on the bottom 71 of the member 42 to cover the wing 50 in the undeployed position, e.g., to cover the wing 50 during driving of the vehicle 10. In such an example, the sheath is releasable from the bottom 71 under forces associated with deployment of the wing 50 from the stowed position to the deployed position.

Figure 5A:
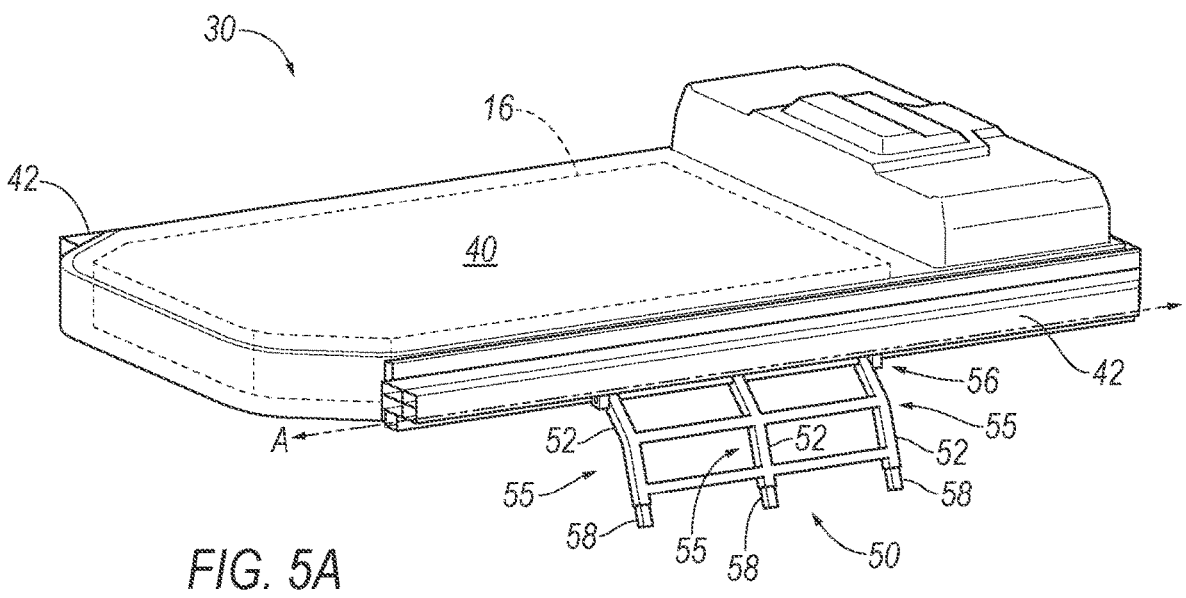
FIG. 5A is the perspective view of FIG. 4A with the wing in the deployed position.
Figure 5B:
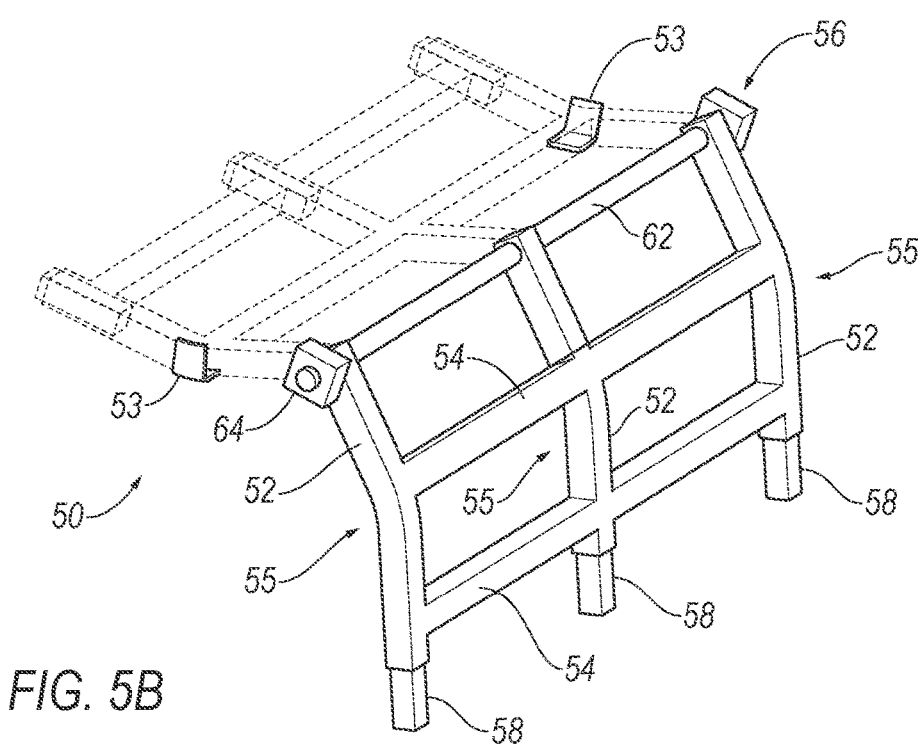
FIG. 5B is a perspective view of a wing in a deployed position and with the wing in the stowed position shown in broken lines.

With reference to FIGS. 5A-5B, the wing 50 may include a plurality of legs 55 that are spaced from each other along the axis A. The legs 55 extend substantially transverse to member 42 in the deployed position. In the example shown in the Figures, the wing 50 includes three legs 55 and in other examples the wing 50 may include any suitable number of legs 55, i.e., one or more. In the stowed position, the legs 55 are spaced from the ground 100. As an example, in the stowed position the legs 55 may abut the bottom 71 of the member 42 and/or the battery compartment 40. In the deployed position, the legs 55 contact the ground 100 so that the legs 55 may distribute impact forces to the ground 100 during certain vehicle impacts.

With reference to FIGS. 5A-6B, one or more leg 55 may be sized to abut the ground 100 in the deployed position. As an example, one or more leg 55 may be telescopic in the deployed position to enable rotation of the leg 55 from the stowed position to the deployed position without contact with the ground 100 and to contact the ground 100 in the deployed position. As an example, as shown in the example in the Figures, the leg 55 may include a hollow member 52 and an extension member 58 telescopically received by the hollow member 52. Specifically, a distal end of each hollow member 52 may be hollow and the respective extension member 58 is telescopically disposed in the distal end of the hollow member 52. In such an example, the extension member 58 may be in a retracted position relative to the hollow member 52 when the wing 50 is in the stowed position and the extension member 58 may slide relative to the hollow member 52 to an extended position. Specifically, the hollow member 52 and the extension member 58 may be designed so that the extension member 58 inertially deploys from the retracted position to the extended position as the wing 50 rotates from the stowed position to the deployed position. In other words, centrifugal force from the rotation of the wing 50 results in the extension member 58 telescoping outwardly from the hollow member 52 to the extended position. The extension member 58 extends farther from the hollow member 52 in the extended position relative to the retracted position. With reference to FIGS. 6A and 6B, the extension member 58 is initially disposed inside a hollow end of hollow member 52 of the leg 55. The hollow member 52 may have a non-circular cross-sections so as to retain rotational position and alignment of the extension member 58 relative to the hollow member 52.

With continued reference to FIG. 5B, in the stowed position, the extension members 58 are substantially disposed within the distal ends of hollow members 52. In the deployed position, the extension members 58 extend from the distal ends of hollow members 52 due to inertial forces while rotating and are configured to extend such that they contact the ground 100 (e.g., roadway, etc.).

The wing 50 includes a lock 73 that locks the extension member 58 relative to the hollow member 52 when the extension member 58 is in the extended position. For example, in the example shown in FIGS. 6A-6B, the lock 73 includes an opening 59 in one of the hollow member 52 and the extension member 58 and a spring-loaded detent 57 on the other of the hollow member 52 and the extension member 58. In the example shown in FIGS. 6A-B, the opening 59 is on the hollow member 52 and the spring-loaded detent 57 is on the extension member 58. The spring-loaded detent 57 is aligned with the opening 59 so that the spring-loaded detent 57 engages the opening 59 when the extension member 58 telescopes to the extended position as shown in FIG. 6B. In the retracted position illustrated in FIG. 6A, the spring-loaded detent 57 is biased against an internal wall of the hollow member 52. For example, this bias against the internal wall may provide a frictional force to hold the extension member 58 in the stowed position until centrifugal force associated with deployment of the wing 50 overcomes the frictional force and moves the extension member 58 to the extended position. In other examples, the lock 73 may be of any suitable type that maintains the extension member 58 in the extended position during loading of impact forces during certain vehicle impacts.

The wing 50 may include one or more cross-members 54 extending between and fixed to the legs 55. In the example shown in the Figures, the cross-members 54 are fixed to the hollow members 52 of the legs. In the illustrated implementation, the cross-members 54 extend substantially parallel to the vehicle-longitudinal axis L, but may be at other angles in other examples. The cross-member 54 may be rigidly fixed to the leg 55, e.g., the hollow members 52, in any suitable manner, such as by welding, adhesive, or fasteners, unitary construction, etc. The legs 55 and the cross-members 54 may be of any suitable material, for example, steel, aluminum, composites, etc. or combinations thereof.

The wing 50 may include retainers 53 to retain the wing 50 in the stowed position absent forces associated with deployment of the wing 50 to the deployed position. The retainers 53 may be frangible upon deployment of the wing 50 to the deployed position. Specifically, the retainers 53 break or release from the wing 50 and/or the member 42 when the wing 50 is moved to the deployed position, i.e., by operation of the pyrotechnic actuator 65, as described below.

The pyrotechnic actuator 65 is operatively coupled to the wing 50 to rotate the wing 50 from the stowed position to the deployed position upon an actuation of the pyrotechnic actuator 65. Two examples of the operative coupling of the pyrotechnic actuator 65 to the wing 50 are shown in the Figures. In the example shown in FIG. 4B, for example, the pyrotechnic actuator 65 may be fixed to the member 42 and directly connected to the wing 50, such as by being positioned on or in the member 42 and having a reaction surface on or contacting a portion of the wing 50, such as a leg 55 (as shown in FIG. 4B) or cross-member 54. In such an example, the pyrotechnic actuator 65 may be a linear actuator that applies linear force to the wing 50 spaced from the hinge 56 to rotate the wing 50 about the hinge 56. In another example, as shown in FIGS. 7A-B, the pyrotechnic actuator 65 may indirectly coupled to the wing 50 through an intermediate component, e.g., the hinge 56. Specifically, the pyrotechnic actuator 65 may be positioned on or in the bearing-end 64 (see FIG. 7B) of the hinge 56 and have a reaction surface on or contacting the shaft 62 of the hinge 56.

In such an example, the pyrotechnic actuator 65 is a rotary actuator configured to rotate the wing 50 relative to the member 42. Upon actuation, the pyrotechnic actuator 65 force the wing 50 to rotate away from the member 42 from the stowed to the deployed. The pyrotechnic actuator 65 may include a pyrotechnic charge. The pyrotechnic charge is activated to activate the pyrotechnic actuator 65. The pyrotechnic charge may be activated, for example, by a restraints control module of the vehicle 10 in response to detection of certain vehicle impacts.

In the example shown in FIGS. 7A and 7B, an example of the hinge 56 is illustrated. The hinge 56 may include the bearing-end 64 attached to the member 42. The hinge 56 may include the shaft 62 that may have a bearing surface 63 disposed within bearing-end 64 to permit rotation of the shaft 62. Although not shown in FIGS. 7A and 7B, the legs 55 of wing 50 may be fixed to the shaft 62 so as to permit rotation of the wing 50 based upon rotation of the shaft 62. In the example shown in FIGS. 7A-7B, the pyrotechnic actuator 65 may be disposed in the bearing-end 64 of the hinge 56 to be operatively coupled to the member 42. In such an example, the pyrotechnic actuator 65 acts on a reaction portion of bearing surface 63 of the shaft 62 within the bearing-end 64 of the hinge 56 to rotate the wing to the deployed position.

The hinge 56 may be configured to permit limited rotation of the wing 50 about an axis parallel to the axis A. Specifically, the hinge 56 stops the rotation of the wing 50 in the deployed position. For example, the hinge 56 may include a stop 75 that stops rotation of the wing 50 in the deployed position. The stop 75 is designed to stop rotation of the wing 50 relative to the member 42 in the deployed position as the wing 50 rotates from the stowed position to the deployed position. The stop 75 may include a spring-loaded tab 66 on one of the shaft 62 and the bearing-end 64 and a recess 68 on the other of the shaft 62 and the bearing-end 64. In the example shown in the Figures, the spring-loaded tab 66 is on the shaft 62 and the recess 68 is on the bearing-end 64. The spring-loaded tab 66 moves into the recess 68 upon reaching to deployed position to operate as a rotational stop. The spring-loaded tab 66 is shown in solid lines in the stowed position in FIGS. 7A-B and in broken lines in the deployed position in FIGS. 7A-B. Upon rotation of shaft 62 to the deployed position, the spring-loaded tab 66, as shown by the dotted lines, is prevented from further rotation by rotational recess 68 to lock the shaft 62 and the rest of the wing 50 into the deployed position. Optionally, a protrusion may be provided adjacent the recess 68 to resist over-rotation.

With reference to FIG. 8, the wing 50 may include an external airbag assembly, which includes an airbag 60 and a corresponding inflator 80. The airbag 60 is supported by the wing 50. In other words, the weight of the airbag 60 is borne by the wing 50. The airbag 60 is rotatable with the wing 50 relative to the member 42 from the stowed position to the deployed position. The airbag 60 may be, for example, on the cross-member 54 when the airbag 60 is in both the uninflated position (FIG. 8) the inflated position (FIG. 9). The airbag assembly may be mounted to the wing 50, as set forth below, and may include one or more airbags mounted to the wings 50 on both sides of the vehicle 10.

The wing 50 and the airbag 60 may include a cover (not shown) to cover the airbag during driving of the vehicle when the wing 50 is in a stored position. In such an example, the cover may be frangible upon deployment of the airbag 60 to permit inflation of the airbag 60.

The airbag assembly may also include an inflator 80 in fluid communication with the airbag 60. The inflator 80 may be fixed to the member 42. Inflation gas from inflator 80 may pass through tubing routed internally or externally to the airbag 60 from the inflator 80 at a remote position on or inside member 42 to the airbag 60.

The airbag 60 may be of any suitable airbag material, for example, a woven polymer. For example, the airbag 60 may be formed of woven nylon yarn, for example, nylon 6-6. Other suitable examples include polyether ether ketone (PEEK), polyetherketoneketone (PEKK), polyester, or any other suitable polymer. The woven polymer may include a coating such as silicone, neoprene, urethane, polyorganosiloxane, etc. The airbag 60 may be a single continuous unit, e.g., a single piece of fabric. Alternatively, the airbag 60 may include a plurality of segments, i.e., two or more. The segments may be attached to each other in any suitable fashion, e.g., a plurality of panels attached by stitching, ultrasonic welding, etc.

The airbag 60 is inflatable from an uninflated position, as shown in FIG. 8, to an inflated position, as shown in FIG. 9. In the uninflated position, the airbag 60 is disposed along the cross-member 54 of wing 50, as shown in FIG. 8. For example, the airbag 60 may be elongated along the longitudinal axis L in the uninflated position. In other words, the longest dimension of the airbag 60 in the uninflated position may be along the longitudinal axis L. The airbag 60 may, for example, be rolled about the longitudinal axis L in the uninflated position, as shown in FIG. 8. That is, the airbag 60 may be rolled into a roll extending along the cross-member 54, i.e., a centerline of the roll of the airbag 60 extends along the cross-member 54 of wing 50.

In order to permit the wing 50 to deploy properly before inflation of airbag 60, a delay may be applied to the activation of the inflator 80 after the activation of the pyrotechnic actuator 65 used to deploy the wing 50.

With reference to FIG. 9, the inflated position may be the position of the airbag 60 at the end of inflation by the inflator 80, i.e., just before the inflator 80 is exhausted. The airbag 60 is external to the passenger cabin in the inflated position. In the inflated position, the airbag 60 extends upwardly, i.e., along the vertical axis, from the wing 50, as shown in FIG. 9. Additionally, in the inflated position, the airbag 60 extends outwardly, i.e., along the cross-vehicle axis, from the wing 50, as shown in FIG. 9. The airbag 60 may, for example, extend through a cover, i.e., through a tear seam, in the inflated position. As another example, the airbag 60 may extend around any cover in the inflated position. Although not illustrated, internal or external tethers may be employed assist in maintaining the shape and stability of the airbag 60.

Use of "in response to," "based on," and "upon determining" herein indicate a causal relationship, not merely a temporal relationship.

The numerical adjectives used herein including "first" and "second are used merely as identifiers and do not indicate importance, order, or quantity.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A vehicle battery enclosure, comprising:
   a first member elongated along an axis and a second member spaced the first member;
   a battery compartment extending between the first member and the second member;

a wing rotatably connected to the first member and rotatable relative to the first member from a stowed position to a deployed position, the wing being aligned with the vehicle battery enclosure along the axis in the deployed position;
a hinge between the wing and the first member;
the wing extending from the hinge vehicle-inboard below the first member in the stowed position and the wing extending from the hinge vehicle-outboard of the first member in the deployed position; and
a pyrotechnic actuator operatively coupled to the wing to rotate the wing to the deployed position.

2. The vehicle battery enclosure of claim 1, wherein the hinge includes a stop designed to stop rotation of the wing relative to the first member in the deployed position as the wing rotates from the stowed position to the deployed position.

3. The vehicle battery enclosure of claim 1, wherein the wing includes legs spaced from each other along the axis, the legs being elongated transverse to the first member.

4. The vehicle battery enclosure of claim 3, wherein the wing includes a cross- member extending between and fixed to the legs.

5. The vehicle battery enclosure of claim 3, wherein legs are sized to abut ground in the deployed position.

6. The vehicle battery enclosure of claim 3, wherein at least one of the legs includes a hollow member and an extension member telescopically received by the hollow member.

7. The vehicle battery enclosure of claim 6, wherein the extension member is retracted in the hollow member when the wing is in the stowed position and is extended from the hollow member to an extended position when the wing is in the deployed position.

8. The vehicle battery enclosure of claim 7, wherein the wing includes a lock that locks the extension member relative to the hollow member when the extension member is in the extended position.

9. The vehicle battery enclosure of claim 7, wherein hollow member and the extension member are sized so that the extension member abuts ground in the deployed position.

10. The vehicle battery enclosure of claim 1, wherein pyrotechnic actuator is fixed to the first member.

11. The vehicle battery enclosure of claim 1, wherein pyrotechnic actuator is a rotary pyrotechnic actuator configured to rotate the wing relative to the first member.

12. The vehicle battery enclosure of claim 1, further comprising an airbag supported by the wing and rotatable with the wing relative to the first member from the stowed position to the deployed position.

13. The vehicle battery enclosure of claim 12, further comprising an inflator in fluid communication with the airbag.

14. The vehicle battery enclosure of claim 13, wherein the inflator is fixed to the first member.

15. The vehicle of claim 1, wherein the first member includes a bottom facing ground and the wing is rotatably connected to the bottom of the first member.

16. A vehicle, comprising:
   a vehicle frame including first frame member and a second frame member spaced from each other cross-vehicle and elongated along a vehicle-longitudinal axis;
   a vehicle battery enclosure including a first member supported by the first frame member and a second member supported by the second frame member;

the vehicle battery enclosure including a battery compartment between the first member and the second member;

a wing rotatably connected to the first member and rotatable relative to the first member from a stowed position to a deployed position, the wing being aligned with the vehicle battery enclosure along the vehicle-longitudinal axis in the deployed position;

the wing being below the first member in the stowed position and the wing being vehicle- outboard of the first member in the deployed position; and a pyrotechnic actuator operatively coupled to the wing to rotate the wing to the deployed position.

17. The vehicle of claim 16, further comprising a hinge between the wing and the first member.

18. The vehicle of claim 16, further comprising an airbag supported by the wing and rotatable with the wing relative to the first member from the stowed position to the deployed position.

19. The vehicle of claim 16, further comprising a battery in the vehicle battery enclosure.

20. A vehicle battery enclosure, comprising:

a first member elongated along an axis and a second member spaced the first member;

a battery compartment extending between the first member and the second member;

a wing rotatably connected to the first member and rotatable relative to the first member from a stowed position to a deployed position, the wing being aligned with the vehicle battery enclosure along the axis in the deployed position;

the wing including legs spaced from each other along the axis, the legs being elongated transverse to the first member;

at least one of the legs including a hollow member and an extension member telescopically received by the hollow member; and a pyrotechnic actuator operatively coupled to the wing to rotate the wing to the deployed position.

\* \* \* \* \*